Dec. 1, 1964
H. D. RITCHIE
3,159,573
RESISTANCE SENSING PROBE SYSTEM
Filed March 30, 1961
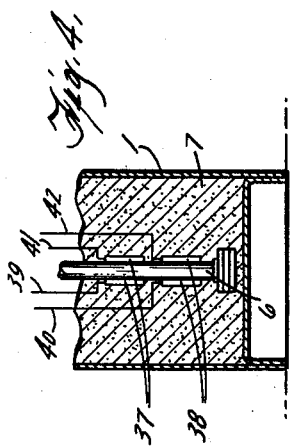
INVENTOR.
HAROLD D. RITCHIE
BY
ANDRUS AND STARKE
ATTORNEYS.

United States Patent Office 3,159,573
Patented Dec. 1, 1964

3,159,573
RESISTANCE SENSING PROBE SYSTEM
Harold D. Ritchie, Kankakee, Ill., assignor to A. O. Smith Corporation, Milwaukee, Wis., a corporation of New York
Filed Mar. 30, 1961, Ser. No. 99,570
5 Claims. (Cl. 210—96)

This invention relates to a resistance sensing probe system particularly adapted to sense the resistance and, therefore, the effective condition of an ion exchange material employed in a water softener.

Ion exchange water softeners and like treating units generally employ an ion exchange bed of a granular material carrying water softening ions which replace the water hardening ions as the water passes through the bed. After selected periods of operation, the bed becomes depleted of water softening ions and saturated with the water hardening ions. The bed must then be regenerated to replace the water hardening ions with water softening ions. Various automatic systems have been employed to effect the regeneration by immersion of all or a portion of the bed within a suitable regenerating solution.

To sense the necessity for regeneration, various schemes have been proposed. Commercially available units generally employ automatic controls which are either flow or time responsive to automatically establish a regeneration cycle after a predetermined volume of flow of water through the bed or after a predetermined period of time has elapsed since the previous regeneration. Other suggestions provide means for measuring the resistance of the water to determine the hardness of the water. All of these methods have certain disadvantages which make them either unreliable or expensive and consequently have not provided a completely satisfactory solution to the problem of sensing the necessity for regeneration of the ion exchange material. The co-pending application of Morris A. Matalon entitled Regeneration Control for Ion Exchange Beds, Serial No. 859,663 which was filed December 15, 1959 and which is assigned to a common assignee with this application and now abandoned, discloses a means for directly sensing the activity or condition of the ion exchange material. In accordance with the above Matalon disclosure, electrodes are directly inserted into the ion exchange material. The resistance between the electrodes is measured. The measured resistance is directly proportional to the activity of the bed and gives a highly accurate method for successively establishing regeneration cycles at precisely the same level of activity. Consequently, very efficient and reliable operation of an automatic water softener is provided.

The present invention is directed to a probe sensing system particularly adapted for directly measuring the activity of an ion exchange bed by comparing of the resistance between several electrodes including a simplified means of securing the probes within the resin.

In accordance with the present invention, the regeneration control valve is mounted to the upper end of the tank. The water outlet conduit extends upwardly through the tank including the resin to the valve. The electrodes or probes are secured to the outlet conduit and the conductors extended outwardly through the control valve. This eliminates the necessity for special fittings for securing of the probes in the wall of the tank.

In accordance with another feature of the present invention, three electrodes are spaced in the direction of water flow through the ion exchange material for detecting the requirement for regeneration. The electrodes are connected in a bridge-type circuit with one of the electrodes being common to different portions of the circuit. With the ion exchange bed in substantially the same condition, the circuit is balanced and maintains the regeneration means in the standby condition. However, as the water flows through the ion exchange material, the softening ions are removed from the ion exchange material and replaced with hardening ions. The bed is progressively depleted from the upstream to the downstream portion of the bed. Therefore, the resistance of the bed adjacent the upstream probe increases and at a selected level of unbalance provides a triggering signal.

The drawing furnished illustrates the best mode presently contemplated for carrying out the invention.

In the drawing:

FIGURE 1 is an elevational view of a water softener including a probe system constructed in accordance with the present invention;

FIG. 2 is a schematic circuit diagram including the probe system shown in FIGURE 1;

FIG. 3 is a fragmentary view of a softener similar to FIGURE 1 employing four probes for determining the necessity for regeneration;

FIG. 4 is a schematic circuit diagram similar to FIG. 2 for the structure of FIG. 3.

Referring to the drawing and particularly to FIGURE 1, a cylindrical water softening tank 1 is shown having a motor-driven control valve 2 coaxially mounted on the top of the tank and overlying a central opening in the top wall of the tank. The valve 2 connects an incoming water main 3 and a service distribution outlet 4 in circuit with the tank 1. The motor-driven control valve 2 include a softener inlet 5 communicating with the upper end of tank 1 and normally maintained connected to the water main 3 by the valve 2 in a known manner. A softener outlet conduit 6 is coaxially secured in tank 1 and extends upwardly from the bottom of the tank to the valve 2. The conduit 6 is normally connected to the service distribution pipe or outlet 4 by valve 2.

The softening tank 1 contains a resinous ion exchange bed 7 of zeolite or the like substantially filling the tank between the water inlet 5 at the top of the tank and the lower end of the water outlet conduit 6 through which soft water is withdrawn from the tank 1.

The hard water coming in through main 3 thus passes through the ion exchange bed 7 where the water hardening ions such as calcium and magnesium are replaced by water softening ions such as sodium ions. The water softening process first depletes the upstream portion of the bed 7 of the water softening ions and progressively depletes the lower or downstream portions of the bed 7. After an indeterminate period of time, the bed 7 no longer contains a sufficient concentration of water softening ions to effectively remove the water hardening ions to a desired or selected level. The bed 7 is regenerated by immersing the ion exchange bed 7 in a regenerating salt solution. The salt solution, normally called brine, provides a very high sodium ion concentration and, in a similar but reverse action to that of the softening process, the water hardening ions in the bed 7 are replaced with water softening sodium ions from the brine. After the bed has been regenerated, all excess brine is removed.

The illustrated valve 2 may be any automatically driven valve adapted to disconnect the soft water inlet 5 and the soft water outlet 6 from main 3 and distribution pipe 4. The valve 2 is generally electroresponsive and may be a motor-driven valve such as shown in the U.S. Patent 1,928,384 referred to in the previously referred to Matalon application. The motor which is not separately shown in FIGURE 1 is described more fully hereinafter in connection with FIG. 2.

Generally, valve 2 connects a drain line 8 to the outlet conduit 6 and a brine line 9 to the softener inlet 5. The tank 1 is then filled with a brine solution to completely immerse the bed 7 therein and regenerate the bed. The valve 2 subsequently disconnects the brine line 9 and reconnects the soft water inlet 5 to the main 3 to backwash the bed 7 and remove all excess brine. Thereafter, the valve 2 returns to the standby position with the softener inlet 5 connected to main 3 and the softener outlet conduit 6 connected to the service distribution outlet 4.

To automatically trigger the electroresponsive valve 2, an upper electrode or probe 10, a middle electrode or probe 11 and a lower electrode or probe 12 are secured in vertically spaced relation to the wall of conduit 6 and embedded therewith in the bed 7. The electrodes 10–12 can be secured to conduit 6 by a suitable adhesive or in any other suitable manner. Leads 14–16 are connected on each for each of the probes 10–12 and extend upwardly along the outer surface of the conduit 6. The leads 14–16 terminate within the valve 2 and connect the probes 10–12 into the control circuit shown in FIG. 2.

Referring to FIG. 2, a balanced bridge 17 includes the probes 10–12 connected within adjacent legs of the circuit. A sensing relay 18 is connected across the output of the bridge 17 to establish a triggering or control signal in accordance with the activity of the ion exchange bed 7. The relay 18 includes a set of contacts 18–1 which are connected in series circuit with a motor 19 of the valve 2. When the balanced bridge 17 responds to a depleted condition of the bed 7, the relay 18 is energized to trigger energization of the motor 19 and establish the regeneration cycle.

The middle probe 11 constitutes a common input to adjacent legs of the bridge 17 with the circuit through said adjacent legs being respectively completed by the bed 7 between the upper probe 10 and the lower probe 12. The bridge 17 is completed by a pair of resistors 20 and 21 connected in series circuit relation with each other and with the legs formed by the probes 10–12 to form a complete bridge loop including four legs. The junctions 22 formed by probe 11 and the diagonally opposite common connection of resistors 20 and 21 constitute a pair of input terminals connected to a set of power lines 23. The connections or junctions 24 of resistors 20 and 21 to probes 10 and 12, respectively, form a pair of output terminals connected to energize relay 18.

A step-down transformer 25 is connected across the power line 23 and includes a secondary winding 26 having one side connected to the lead 15 of the input junction 22 formed by middle probe 11 and the opposite side connected to the input junction 22 formed by the connection of the resistors 20 and 21. The step-down transformer 25 reduces the incoming power line voltage to a low control voltage to prevent excessive and dangerous voltages in the control and the circuit between the probes 10–12.

With the bed 7 between the middle electrode 11 and the oppositely disposed upper probe 10 and the lower probe 12 of the same softening activity, equal resistances are inserted in the adjacent bridges legs including the probes 10–12. The resistors 20 and 21 are the same and consequently the bridge 17 is balanced and no potential difference exists across the output junctions 24.

As the water softening process continues, the bed 7 becomes progressively depleted from the top of the bottom of the bed. When the bed 7 between the upper probe 10 and the middle probe 11 becomes depleted, the resistance of the bed increases. The leg formed by the middle probe 11 and the upper probe 10, therefore, includes a greater resistance than the adjacent leg formed by probes 11 and 12 and causes unbalance of the bridge 17. At a selected level of depletion, the unbalance is sufficiently great to establish a regeneration cycle.

A transistor 27 includes a base 28 connected to the junction 24 and an emitter 29 connected to the opposite junction 24. A collector 30 is connected in series circuit relation with a relay winding 31 of the relay 18 and a diode 32 to one side of the transformer secondary 26. A smoothing capacitor 33 is shown connected across the relay winding 31 in accordance with usual practice. With the bridge 17 balanced, the transistor 27 is biased to cutoff and consequently no current can flow through the relay winding 31. At the level of unbalance created by selected depletion or exhaustion of the bed 7 between the middle electrode 11 and the upper electrode 10, a voltage signal is applied to base 28 and biases the transistor 27 to conduct. A triggering current flows in relay winding 31.

The energization of winding 31 actuates relay 18 to close the associated contacts 18–1 and complete the connection of motor 19 to power lines 23. The motor 19 is, therefore, energized to drive the valve 2 and initiate the regeneration cycle.

A pair of latching contacts 34 are connected in parallel with the contacts 18–1 and coupled through a cam 35 to the motor 19. The motor 19, therefore, maintains itself energized for one revolution of cam 35 which constitutes a regeneration cycle independently of the relay contacts 18–1.

The motor 19 operates the valve 2 to establish the regeneration cycle; sequentially immersing the bed 7 in a brine solution for a regenerating period, backwashing to remove all excess brine solution and then re-establishing the softening connection as generally previously described.

A push button switch 36 is connected in parallel with contacts 18–1 and latching contacts 34 to allow manual establishment of the regeneration cycle. The manual control is necessary to protect against the condition where the bed 7 between the probes 10–12 is at the exhausted level. Thus, in case of a power failure, water may continue to flow through the bed 7 and cause exhaustion of the material between the lower probe 12 and the middle probe 11 to be at such a level that the balance of the bridge 17 is maintained. When power returns, the bridge circuit remains balanced. This is indicated rather readily by the hard water condition in the service distribution system and the bed 7 is then regenerated by actuation of switch 36.

FIGS. 3 and 4 illustrate the invention employing more than three electrodes and additional amplification to allow the use of a less sensitive ion exchange material. Similar elements in the illustration of FIGS. 3 and 4 and the illustration in FIGS. 1 and 2 are numbered in accordance with the illustration of FIGS. 1 and 2 for simplicity and clarity of explanation.

In FIG. 3, two pairs of electrodes 37 and 38 are secured in vertically spaced relation to the conduit 6 and connected by suitable leads 39, 40, 41 and 42 to a control circuit shown in FIG. 4. The leads 39 and 40 from one electrode in each pair 37 and 38 are connected in common and connected to one side of the transformer secondary 26. Leads 41 and 42 connect the other electrode of each pair respectively to the output terminals 24.

In FIG. 4, a second amplifying transistor 43 of the NPN variety is provided. The transistor 43 includes a base 44 connected to the output collector 30 of the transistor 27. An emitter 45 of the transistor 43 is connected in series circuit with the diode 46 to the one side of the transformer secondary 26. The collector 47 is connected in series circuit with the relay winding 31 of the relay 18 to the opposite side of the transformer secondary 26.

Basically, the operation of the illustrative structure and circuit of FIGS. 3 and 4 is identical to that shown in FIGS. 1 and 2 except that the pairs of electrodes 37 and 38 and cascade amplification of transistors 27 and 43 establish an extremely sensitive response to a very minute triggering signal. In the structure of FIG. 3, the resistance of the resin between the pair of electrodes 37 is compared with the resistance of the resin between the pair of electrodes 38. At a selected difference in resistance, the relay 18 is actuated to initiate a regeneration cycle. A very slight current to the base 28 of transistor 27 is reflected by a relatively high current in the collector 44 of transistor 43 because of the increased sensitivity. Consequently, relay 18 is energized in response to small resistance variations of the bed above and below probe 11.

The electrode or probe system of this invention is very simple and reliable and can be employed with ion exchange material having only slight changes in the resistance between a charged and an exhausted state.

Various modes of carrying out the invention are contemplated as being within the scope of the following claims particularly pointing out and distinctly claiming the subject matter which is regarded as the invention.

I claim:

1. In combination with a water softener tank having a softening resin and having a control valve and a regeneration control circuit, the improvement comprising a water conduit connected to the valve and extending inwardly through an opening in the tank into the resin, electrode means including at least three separate electrodes disposed within the resin and secured to the outer surface of the water conduit, and electrical leads secured to the electrode means and extending outwardly through the opening and operatively connected in the regeneration control circuit.

2. In the combination of claim 1 wherein the opening in the tank is provided in the top wall and the control valve overlies the opening to seal the opening and wherein said electrode means constitutes a plurality of electrodes spaced in the direction of the outer conduit.

3. In the combination of claim 1 having a second water conduit secured to an opening in the tank to provide for flow through the tank in the direction of the first conduit, said electrode means secured to the first water conduit and spaced axially thereof and three separate electrical leads connecting said electrodes in paralleled branch circuits, the intermediate one of said electrodes being common to both branch circuits.

4. The combination of claim 1 having an amplifier having an input connected to the leads to provide an amplified output proportional to small variations in the resistance of the resins adjacent the electrode means.

5. In the combination of claim 1 wherein said electrodes include spaced electrode pairs secured to said conduit in axially spaced relation and wherein said conduit extends in the direction of flow through the softener tank.

References Cited in the file of this patent

UNITED STATES PATENTS

| | | |
|---|---|---|
| 1,471,238 | Burkhard | Oct. 16, 1923 |
| 2,599,413 | Reichertz | June 3, 1952 |
| 2,627,503 | Anderson | Feb. 3, 1953 |
| 2,628,194 | Gilwood | Feb. 10, 1953 |
| 2,832,734 | Eckfeldt | Apr. 29, 1958 |
| 2,834,937 | Raynor | May 13, 1958 |
| 2,851,654 | Haddad | Sept. 9, 1958 |
| 2,902,155 | Lundeen | Sept. 1, 1959 |

FOREIGN PATENTS

| | | |
|---|---|---|
| 714,642 | Great Britain | Sept. 1, 1954 |